United States Patent [19]
Matheson

[11] Patent Number: 6,159,058
[45] Date of Patent: Dec. 12, 2000

[54] RETRACTABLE SUSPENSION FOR A BOAT

[76] Inventor: Robert Wade Matheson, 675 Winger Road, Williams Lake, British Columbia, Canada, V2G 3S6

[21] Appl. No.: 09/321,484

[22] Filed: May 27, 1999

Related U.S. Application Data

[60] Provisional application No. 60/086,883, May 27, 1998.

[51] Int. Cl.[7] ..................................................... B60F 3/00
[52] U.S. Cl. ...................... 440/12.5; 114/344; 280/414.1
[58] Field of Search ........................... 114/344; 440/12.5; 280/414.2, 414.1

[56] References Cited

U.S. PATENT DOCUMENTS

| | | | |
|---|---|---|---|
| 2,781,529 | 2/1957 | Moody | 114/344 |
| 3,755,835 | 9/1973 | Boersig | 114/344 |
| 3,858,260 | 1/1975 | Hanser | 114/344 |
| 3,902,741 | 9/1975 | Rudder | 280/414.1 |
| 4,588,203 | 5/1986 | Anderson | 114/344 |
| 4,800,832 | 1/1989 | Sulimierski | 114/352 |
| 5,520,138 | 5/1996 | Humphrey | 114/344 |
| 5,632,221 | 5/1997 | Trenne et al. | 114/344 |

FOREIGN PATENT DOCUMENTS 1332887  11/1994  Canada .

*Primary Examiner*—Jesus D. Sotelo
*Attorney, Agent, or Firm*—Reidlaw, L.L.C.; John S. Reid

[57] ABSTRACT

A retractive suspension for a boat is provided whereby retractable wheels and associated struts and suspension may be retractably mounted within compartments which are open, or may be opened, outwardly of a hull of a boat. A front wheel assembly is housed retractably within the bow of the boat. An opposed pair of rear wheels are mounted within corresponding compartments on either side of the aft end of the hull. The wheels struts and suspension, both fore and aft, are selectively pivotable from a stowed position within the compartments or wheel wells to an extended and locked position extending outwardly of the boat hull from the wheel wells so as to support the boat on the wheels when on land. The struts and suspension are pivoted by means of threaded rod or spindle or elongate screw which is rotated to slide one end of an arm snugly mated within a corresponding slide such as a box beam.

13 Claims, 11 Drawing Sheets

RETRACTABLE SUSPENSION FOR A BOAT

CROSS REFERENCE TO RELATED APPLICATION

This application claims priority from U.S. Provisional Patent Application No. 60/086,883 filed May 27, 1998 tilted Retractable Suspension for a Boat.

FIELD OF THE INVENTION

This invention relates to the field of amphibious boats generally, and in particular, to retractable highway compatible wheel assemblies retractable into mid-size runabout boats.

BACKGROUND OF THE INVENTION

The desirability of mounting retractable wheel assemblies onto boats generally is well recognized in the prior art. In particular, applicant is aware of Canadian patent No. 1,332,817 entitled "Retractable Wheels" which issued Nov. 8, 1994 to Royle. Royle discloses a vehicle, depicted to be boat, having a steerable wheel and a mechanism for retracting the wheel into a compartment within the boat. A pair of nose wheels may be extended from a nose wheel compartment so as to bear the forward weight of the amphibious boat. The nose wheels are mounted onto a steering column. The aft of the boat may be supported on a pair of aft mounted laterally spaced apart wheels each retractable into compartments on either side of the aft end of the boat.

Applicant is also aware of U.S. Pat. Nos. 3,858,260, 3,902,741, 4,800,832, 4,588,203, 5,520,138, and 5,632,221, all of which are directed to amphibious vehicles having retractable wheel assemblies or to the retractable assemblies themselves. None of these references teach nor disclose the advantages of the present amphibious craft and related assemblies and in particular, none of them are well adapted for towing at highway speeds when supported by only the amphibious craft wheels. In particular, none of the references incorporate a suspension and locking system which may be Department of Transport approved for use on highways. Consequently, it is an object of the present invention to provide wheel and suspension retractable assemblies which will allow a mid-sized runabout boat to be towed at highway speeds, it not being an object of the present invention to provide an amphibious craft in the sense of being self-powered when on land or self-steerable when on land.

SUMMARY OF THE INVENTION

In the present invention, a retractable suspension for a boat is provided whereby retractable wheels and associated struts and suspension may be retractable mounted within compartments which are open, or may be opened, outwardly of a hull of a boat. A front wheel assembly is housed retractably within the bow of the boat. An opposed pair of rear wheels are mounted within corresponding compartments on either side of the aft end of the hull. The wheel struts and suspension, both fore and aft, are selectively pivotable from a stowed position within the compartments or wheel wells to an extended and locked position extending outwardly of the boat hull from the wheel wells so as to support the boat on the wheels when on land.

In one preferred embodiment, the struts and suspension are pivoted by means of threaded rod of spindle or elongate screw which is rotated to slide one end of an arm snugly mated within a corresponding slide such as a box beam. The strut and suspension assemblies may, preferably, be conventional automotive components rotatably coupled to the sliding mount within the box beam by a rotatable couple which allows the suspension unit to be translated along the threaded spindle, screw or rod, and simultaneously rotated as the corresponding wheels and struts are pivotally deployed from the wheel wells. Once the wheels are deployed, them form a tricycle arrangement to support the weight of the boat when it is being towed on land. Deploying the wheels may also be used to raise the boat once the boat has been loaded onto a rocky or otherwise inhospitable shore so that the boat may be left beached without the worry of damage to the hull.

In summary, the retractable suspension and wheel apparatus for a watercraft of the present invention includes a selectively retractable nose wheel mounted within a nose wheel cavity of a hull, towards a forward end of the hull, and a laterally spaced apart pair of rear wheels mounted on first ends of elongate members, within aft wheel wells in side walls of the hull. The elongate members are pivotally mounted at second ends thereof to the hull within the aft wheel wells. The elongate members are selectively pivotable by actuation of selective actuators so as to rotate the rear wheels between an elevated storage position within the aft wheels and a lower extended and locked position.

The elongate members are selectively pivotable by means of suspension struts pivotally mounted at lower ends thereof to the elongate members and pivotally mounted at upper ends thereof to the selective actuators. The selective actuators are actuable so as to selectively drive the upper ends of the suspension struts from a position forward in the aft wheel wells, wherein the elongate members are rotated up so as to retract the rear wheels into the elevated storage position, to a position aft of the second ends of the elongate members wherein the elongate members are rotated down so as to extend the rear wheels into the extended and locked position. In that position the suspension struts are releasably locked in an over-center position in the aft wheel wells.

Advantageously, the selective actuators include carriages threadably journalled onto correspondingly threaded elongate threaded members. The elongate threaded members are rotatably mounted to the hull, one of each in each of the aft wheel wells. The threaded members are aligned generally parallel to the centerline of the hull. They are selectively rotatable so as threadably drive the carriages longitudinally along the elongate threaded members. The upper ends of the suspension struts are pivotally mounted to the carriages. Thus, driving the carriages along the threaded members pivots the elongate members whereby the rear wheels may be raised or lowered. Driving the carriages along the thread members aft so as to position the carriages aft of the second ends of the elongate members when the rear wheels are lowered releasably locks the suspension struts in the over-center position. The elongate members are thereby releasably locked, locking the rear wheels in the extended and locked position. The suspension struts may be shock absorber and coil spring suspension assemblies, and the carriages may be slider blocks. The lower ends of the suspension struts are advantageously pivotally mounted to said elongate members at generally a mid-point along the elongate members. The slider blocks may be made of UHMW polyethylene.

In one aspect of the present invention, the nose wheel cavity is selectively sealed by a watertight door when the nose wheel is retracted into the nose wheel cavity. The watertight door is shaped so as to conform to the shape of the hull when the watertight door is closed. In a further aspect, the watertight door is a sliding door selectively openable by a selective actuator so as to slide the door from a closed position under the bow of the hull to an open position aft along and under the hull.

In a second aspect, an elongate sliding hitch bar is slidably mounted in a longitudinally extending bow cavity in the forward end of the hull. The hitch bar is lockably positionable in the bow cavity between a retracted position contained generally within the bow cavity and an extended position extended and cantilevered forwardly of the bow for releasable mounting of a distal end of the hitch bar to a tow bar.

In yet a further aspect, the rear wheels, when in their extended and locked position, are located generally at a balance point of the hull. Trailering of the hull on roadways with the nose wheel retracted is thereby facilitated.

Put another way, in the present invention, a hull has an independently retractable nose wheel and a retractable laterally oppositely disposed pair of rear wheels. The nose and rear wheels are arranged in a tricycle wheel arrangement. The nose wheel is retractable for trailering of the hull on roadways and for use of the hull on water. The rear wheels are retractable for use of the hull on water. The nose and rear wheels are extendible beneath the hull for towing the hull over land between the water and the roadways.

DETAILED DESCRIPTION OF THE PREFERRED EMBODIMENT

Figure 1:
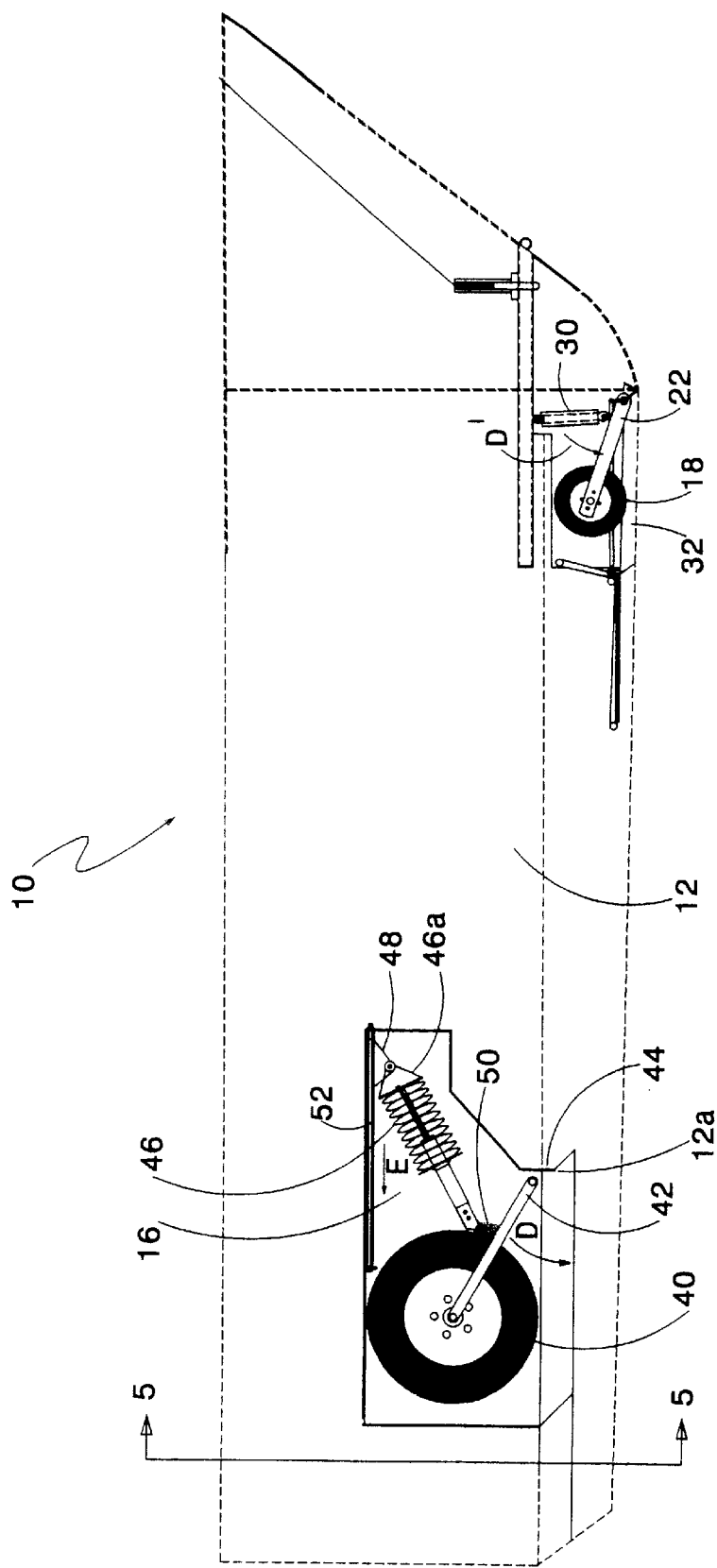
FIG. 1 is, in partial cut-away side elevation view, a watercraft incorporating the retractable suspension and wheel assemblies of the present invention in their retracted and stored positions.

As seen in FIG. 1, watercraft 10, which may be illustrated be 18 feet long but is understood may be any mid-sized runabout class watercraft, for example up to 22 feet long, has a hull generally designated by the reference numeral 12. Hull 12 has formed in the bow thereof forward wheel well 14, and has formed in the aft end on each laterally spaced apart side of hull 12 aft wheel wells 16. It is understood that although only the aft wheel well 16 on the starboard side of hull 12 is illustrated in the side elevation views, the mirror image of wheel well 16 and associated structure as hereinafter described is also found on the port side.

Figure 1A:
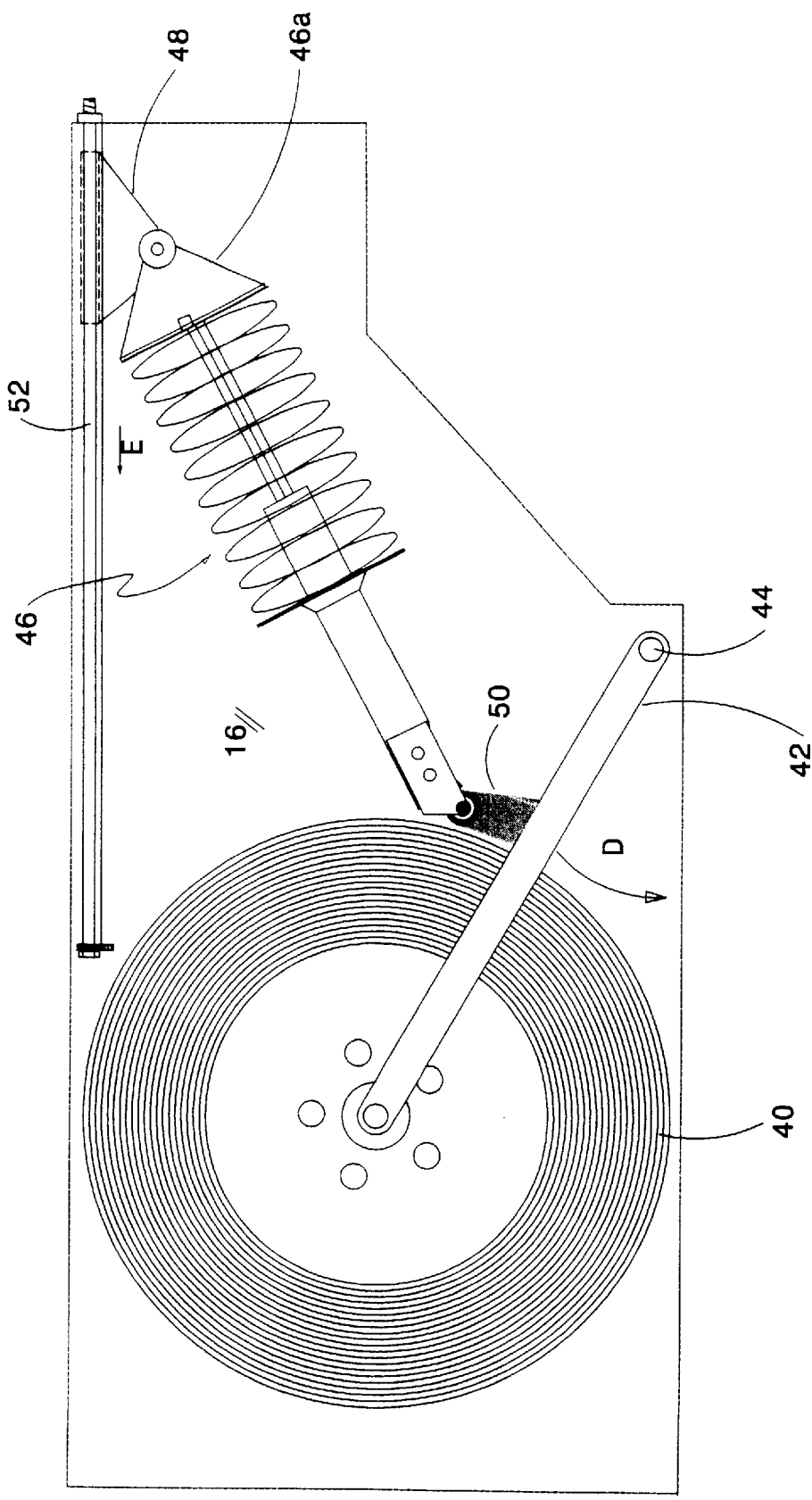
FIG. 1a is, in enlarged view, one rear wheel and suspension assembly of FIG. 1.
Figure 1B:
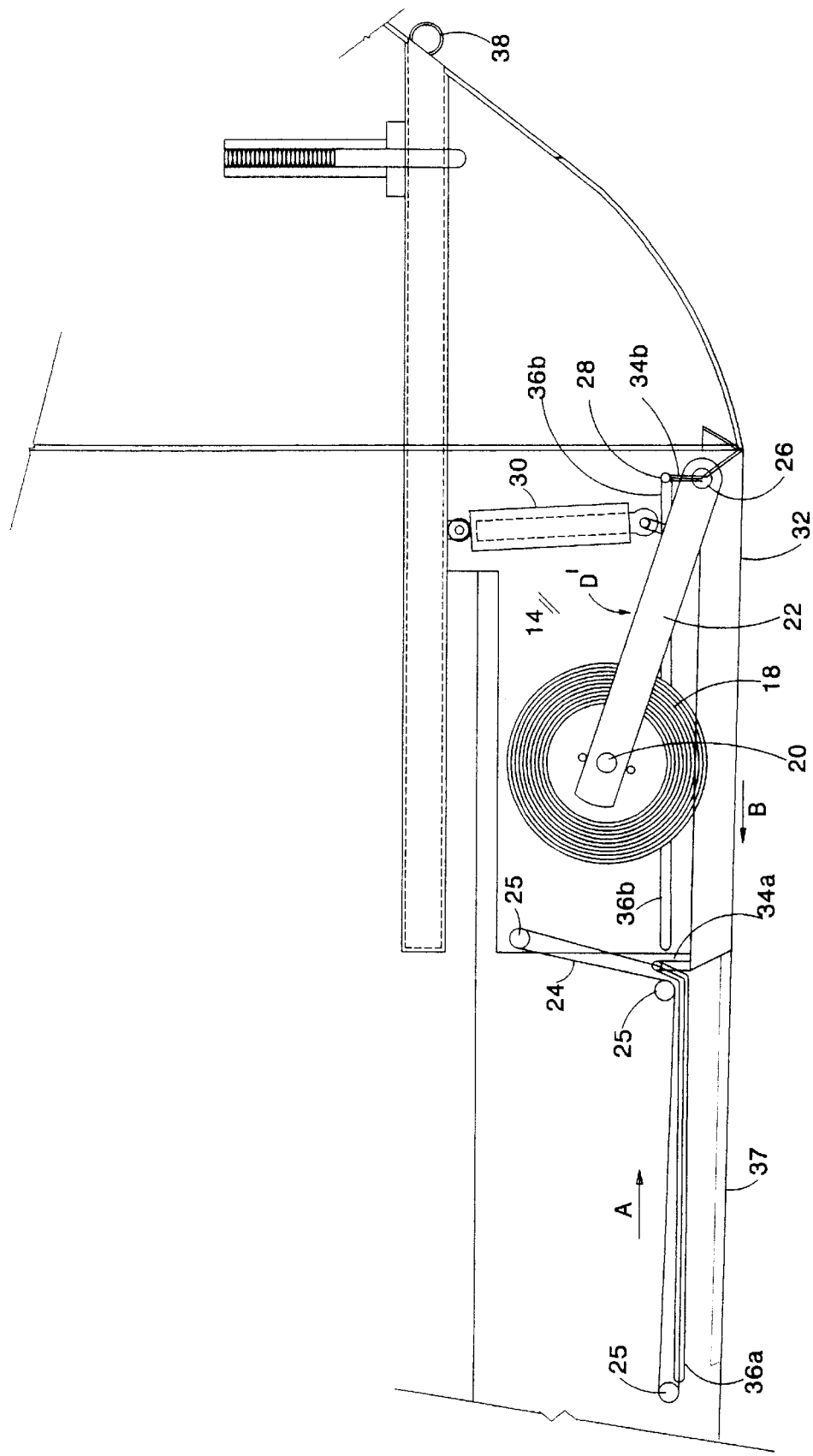
FIG. 1b is, in enlarged view, the front wheel and deployment assembly of FIG. 1.

As better seen in FIG. 1b, forward wheel well 14 is formed as a cavity having rigid interior walls. Nose wheel 18, advantageously a 10 inch diameter pneumatic utility tire and rim, is rotatably mounted about stub axles 20 between nose wheel forks 22. Nose wheel forks 22 are pivotally mounted so as to be rotatable about an axle, shaft or pin 26. Cylinder 30 when actuated rotates nose wheel 18 on forks 22 in direction D' about pin 26. Pins 26 are mounted to a rigid interior bearing wall 28 within forward wheel well 14 so as to allow rotation of forks 22 in a generally vertical plane containing the longitudinal plane of symmetry of hull 12.

Figure 2:
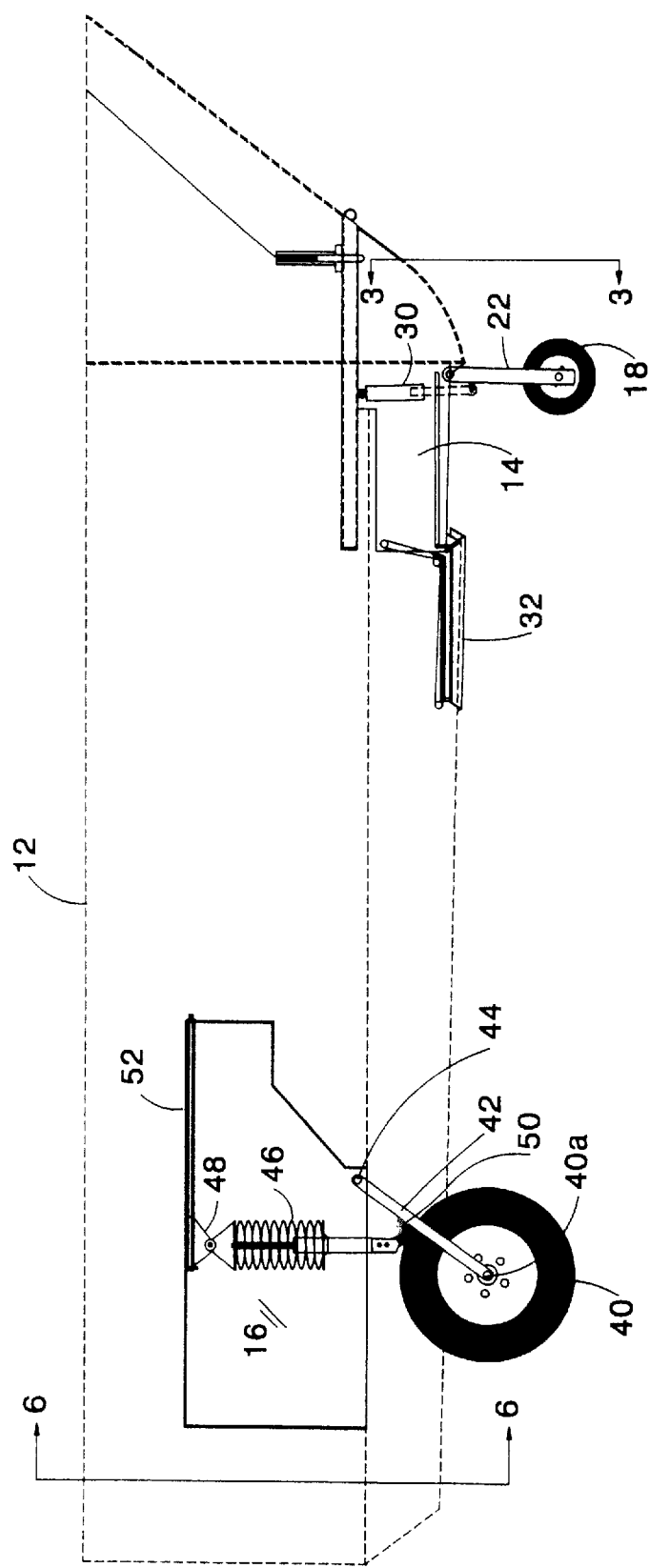
FIG. 2 is, in side elevation partially cut-away view, the watercraft of FIG. 1 with the suspension and wheel assemblies in their extended positions.
Figure 2A:
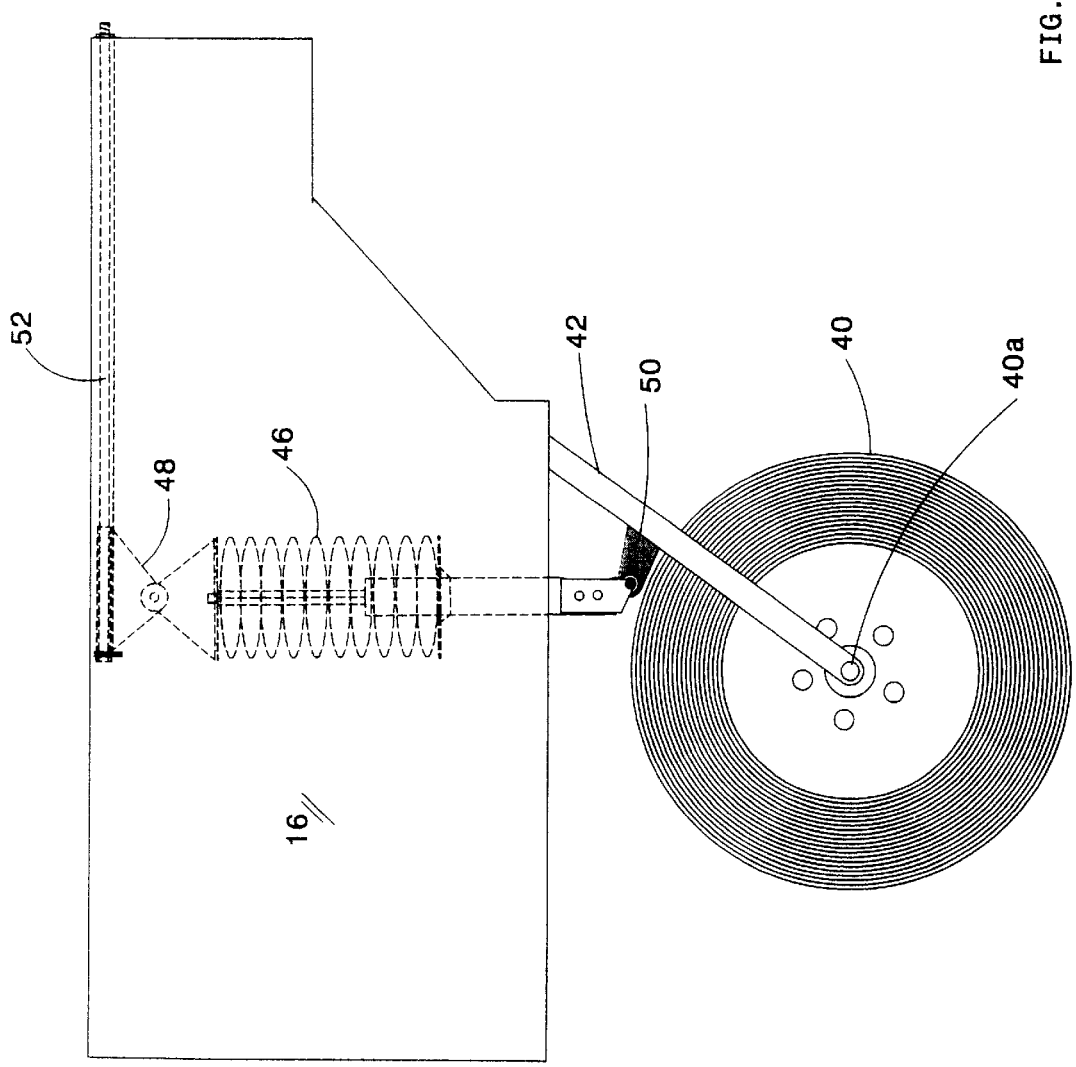
FIG. 2a is, in enlarged view, one rear wheel and suspension assembly of FIG. 2.
Figure 2B:
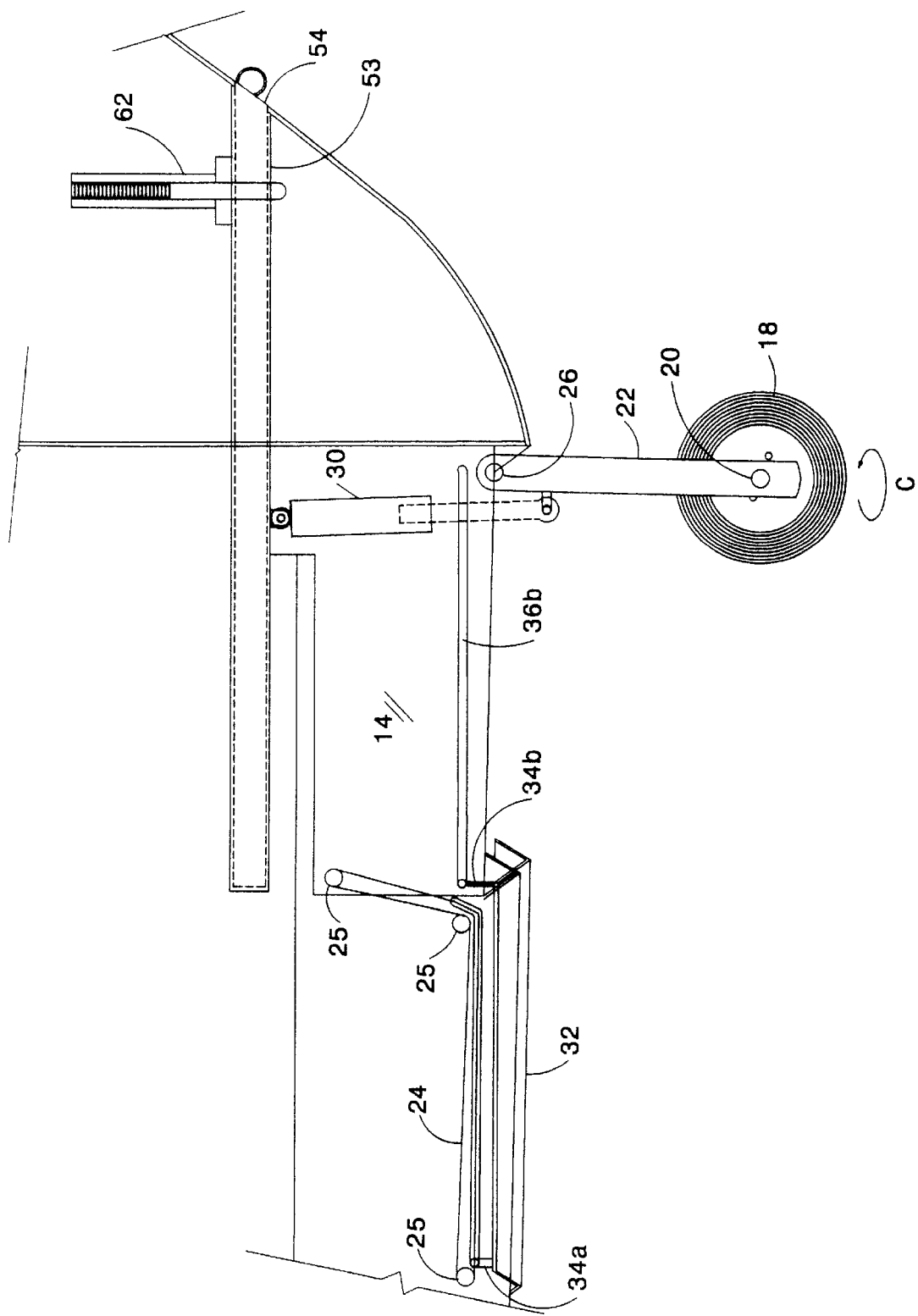
FIG. 2b is in enlarged view, the front wheel and deployment assembly of FIG. 2.

As seen in FIGS. 2 and 2b, nose wheel 18 and forks 22 may be rotated from their stored position seen in FIG. 1 into a generally vertically deployed position by means of selective actuation of selectively actuable cylinder 30 once door 32 is opened. In its closed position door 32 is conformal to the shape of the hull.

Door 32 is retracted form its forward closed position seen in FIG. 1b to its rearward opened position seen in FIG. 2b by use of chain or cable drive linkage 24. Driving linkage 24 around pulleys 25, one or more of which may be drive pulleys, in direction A drops guide arms 34a down, so as to be drawn along, guide channels 36a. Door 32 is thereby slid open in direction B, guide arm 34a also sliding in direction in hull slot 34. As door 32 is slid open in direction B, guide arm 34b slides along guide channel 36b. Door 32 is closed by reversing the direction of the drive linkage 24, the forward edge of the door notching into the hull, for example by means of a tongue-and-groove mating. All wear surface are of UHMW (ultra high molecular weight) polyethylene.

Once nose wheel 18 and forks 22 are fully lowered, the bow of hull 12 is supported on wheel 18. With the rear wheels also in their extended position as hereinafter described, watercraft 10 may then be towed, for example by means of tow eye 38. Directional steering during such towing may be accommodated by rotation of nose wheel forks 22 in direction C by for example use of pivotable couplings known in the art.

Figure 3:
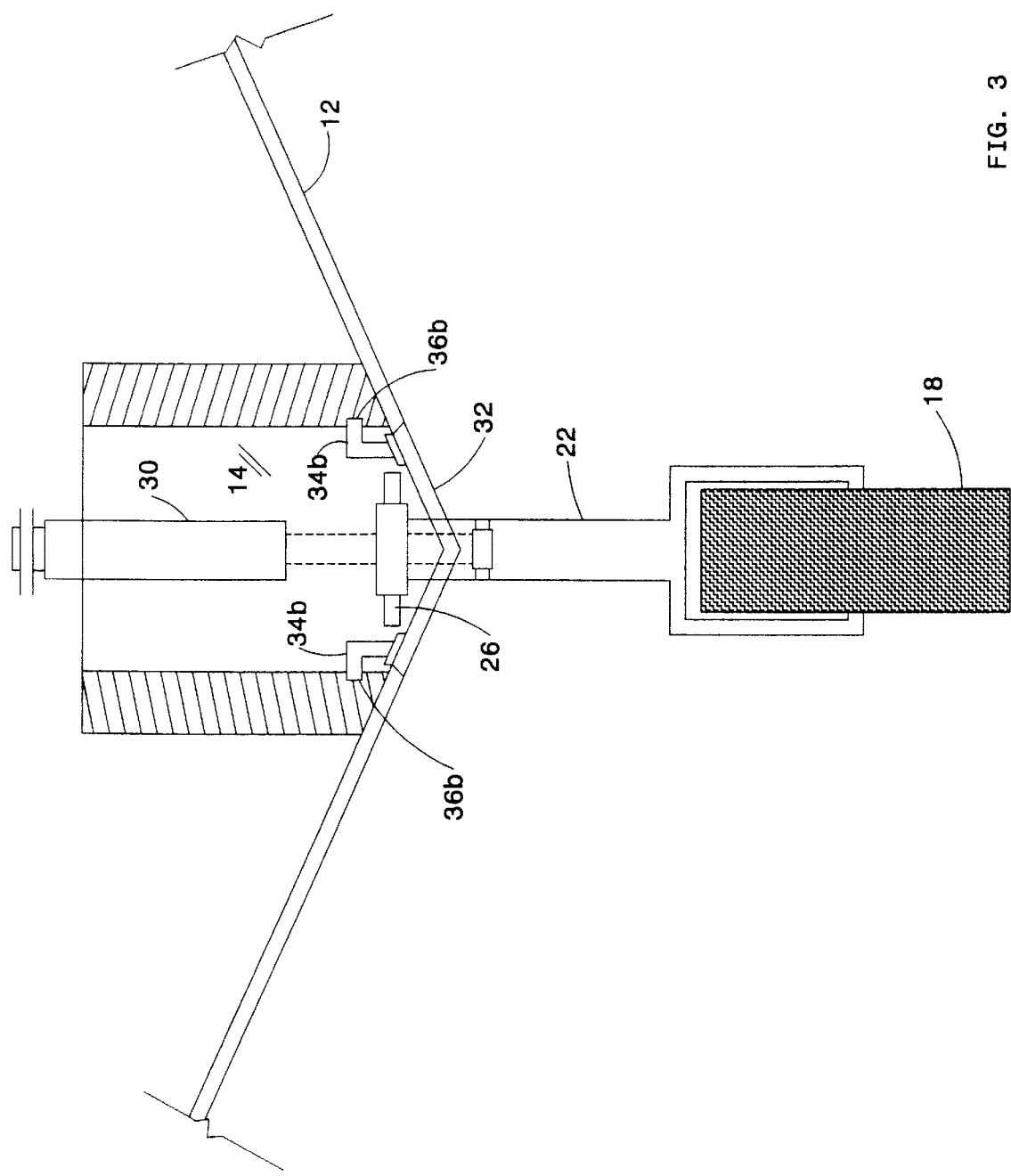
FIG. 3 is a sectional view along line 3—3 in FIG. 2.

Rear wheels 40, advantageously 13 inch diameter tires and rims, may simultaneously be extended from their storage position as seen in FIGS. 1 and 1a to their extended position seen in FIGS. 2, 2a and 3. Wheels 40 are rotatably mounted on one end of wheel struts 42. The opposite ends of wheel struts 42 are pivotally mounted by means of stub axles 44 to a rigid interior wall of aft wheel wells 16. Axle bushings are of UHMW polyethylene. Strut suspensions 46, which may be McPherson™ strut suspensions, are pivotally mounted at their uppermost end to trolleys 48 and pivotally mounted at their lowermost end to wheel struts 42 by means of lever arms 50. Lever arms 50 are rigidly mounted to wheel struts 42 and pivotally mounted to the lowermost end of strut suspensions 46. Strut suspensions 46 may be automatically suspension components and may, as seen, include an elongate centrally aligned shock absorber which may be pneumatic, hydraulic, or of other designs known in the art journalled through a coil spring, although this is not intended to be limiting. Pivoting joints are rubber mounted to the absorb shock.

Rear wheels 40 are lowered from their deployed position to their extended position by the rotation of wheel struts 42 in direction D about stub axles 44. This is accomplished by driving uppermost end 46a of strut suspension 46 in direction E by driving slider blocks or trolleys 48 also in direction E along threaded rods 52. Rods 52 may advantageously be ½ inch threaded rod incorporating ACME thread. Rods 52 are supported at their ends in sealed bearings. Threaded rods 52 are threadably journalled through corresponding threaded bores sleeves or collars in trolleys 48. Trolleys 48 are advantageously of UHMW polyethylene. Threaded rods are selectively rotated by electric motors (not shown) or other appropriate drive means known in the art to thereby control the relative position of trolleys 48 along the length of threaded rods 52.

The geometry, as illustrated by way of example in FIGS. 1 and 2, between wheel struts 42 and strut suspensions 46 allow driving of trolleys 48 in direction E into their over-center lockable position illustrated in FIG. 2, over-center relative to lever arms 50 on wheel struts 42, generally in vertical alignment above the axis of rotation of rear wheels 40. Thus, advantageously, trolley 48 is at a forward end of threaded rod 52 when rear wheels 40 are in their storage position. Once trolleys 48 have been driven in direction E to their over center position, trolleys 48 are generally located aft along the length of threaded rods 52 over wheel axles 40a.

The rear wheel strut and suspension assembly thus provides a roadworthy structure which may receive Department of Transport approval for highway usage in that threaded rod 52 may be releasably locked into place by locking means (not shown) so that the relative position of strut suspensions 46 relative to hull 12, wheels 40 and wheel struts 42 may be locked into place.

Figure 4:
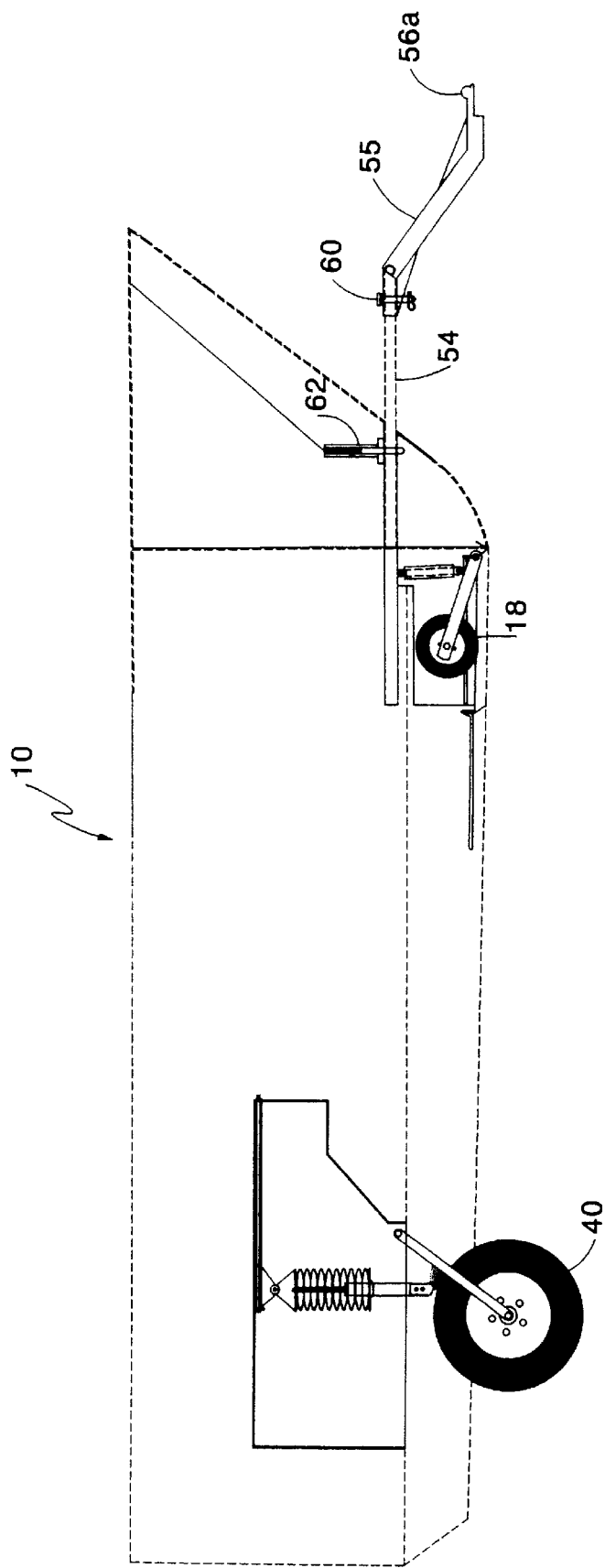
FIG. 4 is the watercraft of FIG. 3 with the nose wheel assembly retracted.
Figure 5:
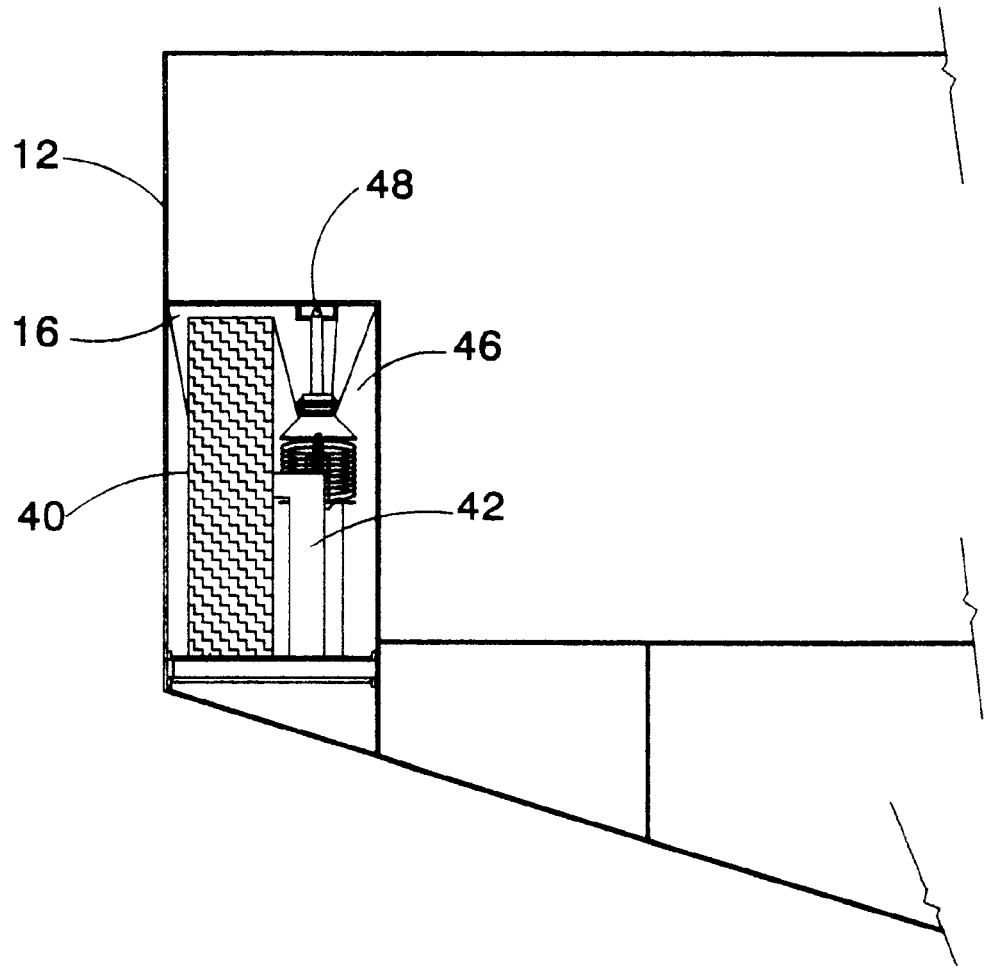
FIG. 5 is a sectional view along line 5—5 in FIG. 1, illustrating one half of a complete sectional view through the boat hull, the side opposite being a mirror image.
Figure 6:
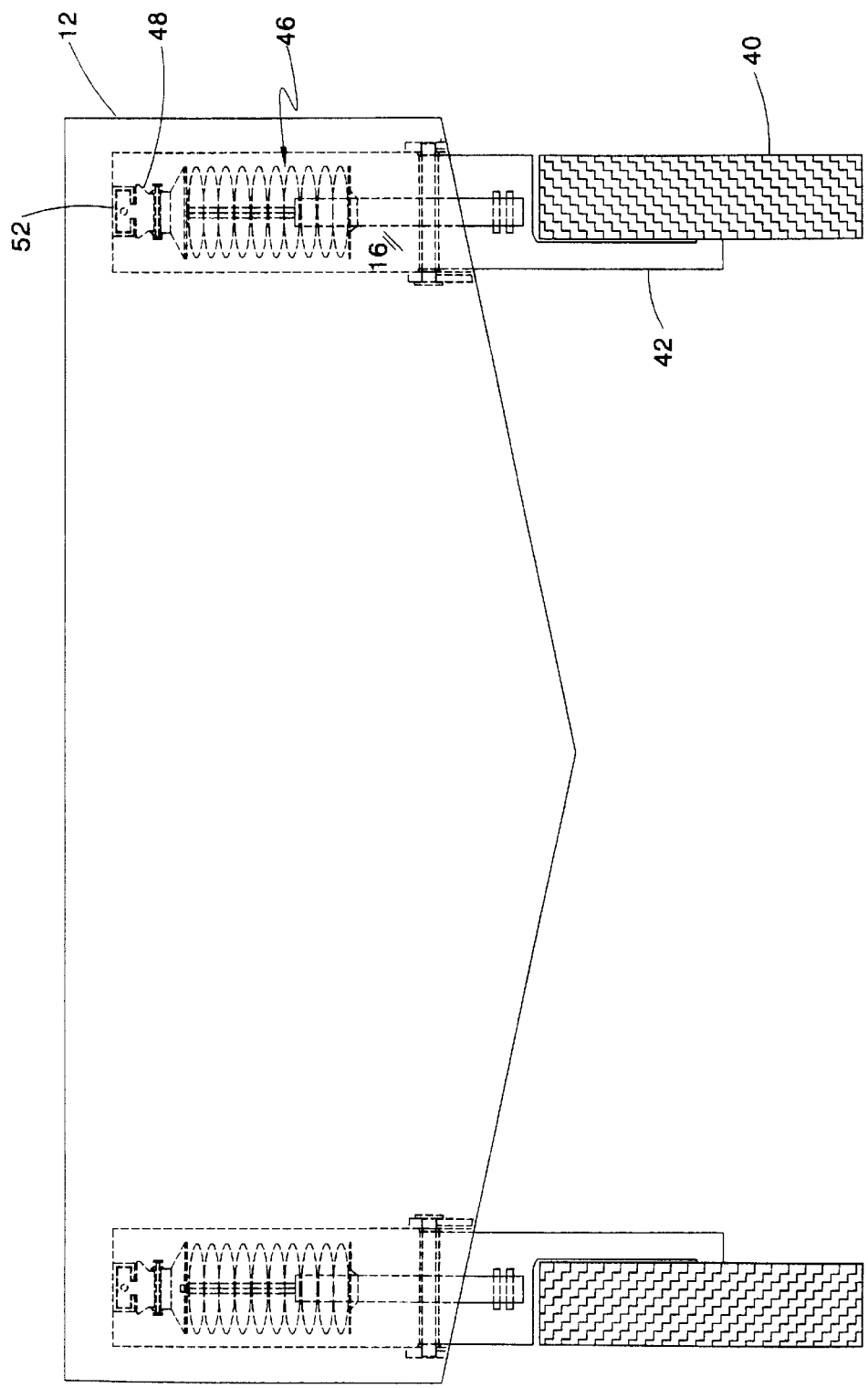
FIG. 6 is a sectional view along line 6—6 in FIG. 2.
Figure 7:
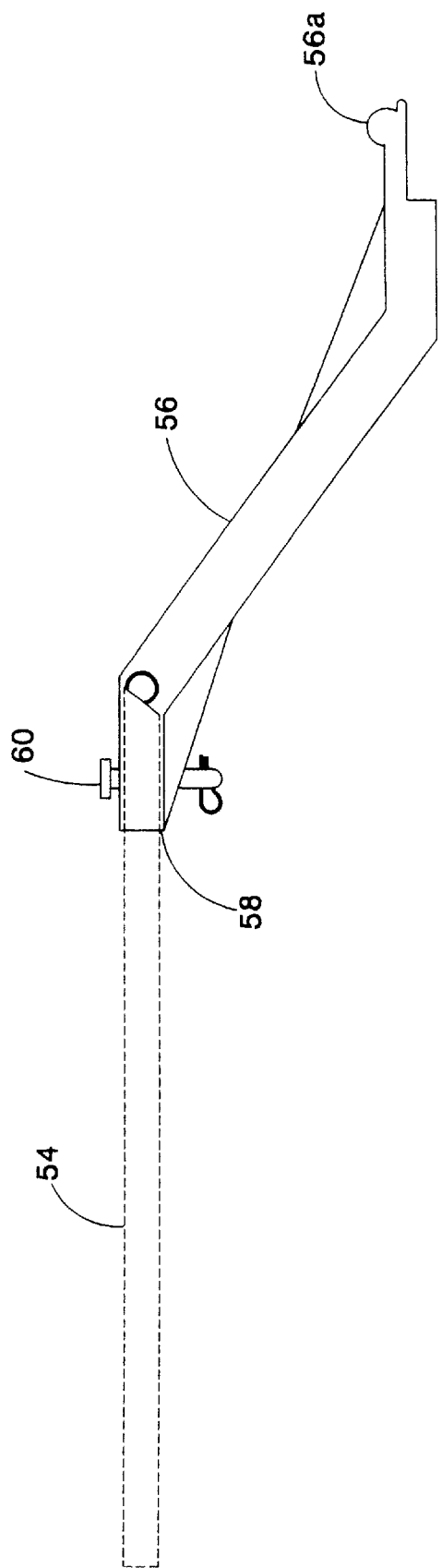
FIG. 7 is, in side elevation view, a hitch assembly mountable to a sliding hitch bar in one aspect of the present invention.

As may be better seen in FIGS. 4 and 7, advantageously the bow of hull 12, above forward rear wheel 14, has a longitudinally extending sleeve 53 therein. A hitch slide bar 54 is slidably mounted journalled in the sleeve. Tow hitch assembly 56 may, as illustrated, have a female receiver for coupling to the end of slide bar 54 once extended from within sleeve 53. To mount hitch assembly 56 to the bow of hull 12, the end of slide bar 54 is inserted into a correspondingly sized receiver cavity 58, for example a 2 inch receiver tube, and releasably locked into place as for example by means of pin 60. Slide bar 54 is releasably locked into extended or retracted positions within sleeve 53 by means of spring assisted pin 62 mating in corresponding holes in slide bar 54. Slide bar 54 is in its extended position in FIG. 4. Once so mounted, hitch hood 56a is maintained in constant fixed relation relative to hull 12 for mounting onto a correspondingly sized towing ball (not shown) on a towing vehicle.

Once hitch hood 56a has been mounted onto the towing ball of the hitch on the towing vehicle, nose wheel 18 may be retracted into its storage position as seen in FIG. 4 so that the entire weight of watercraft 10 is borne on rear wheels 40 in the manner of a conventional boat and trailer combination. Watercraft 10 may then be towed in the usual manner at highway speeds.

In use, FIG. 1 illustrates the watercraft 10 of the present invention in its configuration for operation on the water. FIG. 2 illustrates its configuration for entry into, or exit from, the water by means of towing on its tricycle wheel assemblies.

Thus, as may be appreciated, the wheel assemblies of the present invention overcome the problem of incorporating a Department of Transport approved suspension system hidden within wheel wells mounted into the hull of a boat or other watercraft. Strut suspension 46 may be conventional McPherson™ strut suspensions such as found on conventional front wheel drive wheels, that is, strut suspensions having combined shock absorbers and springs. In the configuration illustrated, the arrangement provides approximately 8 inches of travel so that watercraft 10 therefore maintains greater than or equal to 10 inches clearance off the ground.

Although in the embodiment illustrated, aft wheel wells 16 are opened downwardly so that open apertures are left in the aft lowermost surface of hull 12, preferred embodiments may incorporate doors which may be selectively actuated to close over the apertures in hull 12, or aft wheel wells 16 may be pressurized in the manner of hovercraft, that is, using edge sheets of air. The compressed air may come from a main power source driving a compressor or the power source exhaust itself may be directed to form the edge sheets of air. The edge sheets of air urge water passing under the hull downwardly and away from entry into aft wheel well 16 through their open apertures. Alternatively, in preferred embodiments, hull 12 is provided with a lateral step 12a, for example, a 1 inch step forward of the apertures into aft wheel wells 16 so that, once planing, hull 12 is stepped up so as to be more clear of the water passing under the hull.

Also in a preferred embodiment, cylinder 30 may be a standard marine hydraulic cylinder used, for example, for raising the leg of an inboard-outboard engine. It is important to note that the nose wheel assembly does not also have to provide a solid locking mechanism because, as described above, during highway towing, the nose wheel assembly is retracted into its storage position. Advantageously, nose wheel 18 is of sufficient size so as not to be so easily buried in soft ground surfaces such as sand in the event that watercraft 10 is to be removed from the water over a beach surface as opposed to a hard surface on a conventional boat ramp. It is one of the objects of the design of the present invention entry into, and exit from, the water may be done over terrain where conventional tractor-trailer combinations would get bogged down.

In the preferred embodiment, threaded rod 52 may also be manually driven by means of a crank or the like for use in emergency situations, and a sensor or indicator may be provided to indicate to the user when trolley 48 is in its position along threaded rod 52 corresponding to the down and locked extended position for rear wheels 40, or corresponding to the up and locked position, that is, the storage position for rear wheels 40.

Further, in the preferred embodiment, hull 12 may be constructed using longitudinal stringers instead of lateral ribs so that hull 12 may be better adapted to absorb trailering loads or stresses put onto hull 12. Thus, further advantageously, rear wheels 40 are mounted so that in their down and locked extended position, they are approximately at the balance point between the fore and aft weight distribution of watercraft 10 thereby more evenly distributing along hull 12 shock loading due to trailering.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A retractable suspension and wheel apparatus for a watercraft, comprising:
   a selectively retractable nose wheel mounted within a nose wheel cavity of a hull, towards a forward end of said hull,
   a laterally spaced apart pair of rear wheels mounted, within aft wheels wells in side walls of said hull, on first ends of elongate members, said elongate members pivotally mounted at second ends thereof to said hull within said aft wheel wells, said elongate members selectively pivotable by actuation of selective actuators so as to rotate said rear wheels between an elevated storage position within said aft wheel wells and a lower extended and locked position, wherein said elongate members are selectively pivotable by means of suspension struts pivotally mounted at lower ends thereof to said elongate members and pivotally mounted at upper ends thereof to selective actuators, said selective actuators actuable so as to selectively drive said upper ends of said suspension struts from a position forward in said aft wheel wells, wherein said elongate members are rotated up so as to retract said rear wheels into said elevated storage position, to a position aft of said second ends of said elongate members wherein said elongate members are rotated down so as to extend said rear wheels into said extended and locked position and said suspension struts are releasably locked in an over-center position in said aft wheel wells.

2. The apparatus of claim 1 wherein said selective actuators include carriages threadably journalled onto correspondingly threaded elongate threaded members, said elongate threaded members, rotatably mounted to said hull within said aft wheel wells and selectively rotatable so as threadably drive said carriages longitudinally along said elongate threaded members, said upper ends of said suspension struts pivotally mounted to said carriages, wherein driving said carriages along said threaded members pivots said elongate members whereby said rear wheels may be raised or lowered, and wherein driving said carriages along said thread members aft of said second ends of said elongate members when said rear wheels are lowered releasably locks said suspension struts in said over-center position wherein said elongate members are releasably locked, locking said rear wheels in said extended and locked position.

3. The apparatus of claim 2 wherein said suspension struts are shock absorber and coil spring suspension assemblies.

4. The apparatus of claim 2 wherein said carriages are slider blocks.

5. The apparatus of claim 4 wherein said slider blocks are made of UHMW polyethylene.

6. The apparatus of claim 1 wherein said nose wheel cavity is selectively sealed by a watertight door when said nose wheel is retracted into said nose wheel cavity, and wherein said watertight door is shaped so as to conform to the shape of said hull when said watertight door is closed.

7. The apparatus of claim 6 wherein said watertight door is a sliding door selectively openable by a selective actuator so as to slide from a closed position under a bow of said hull to an open position aft along and under said hull.

8. The apparatus of claim 1 further comprising an elongate sliding hitch bar slidably mounted in a longitudinally extending bow cavity in said forward end of said hull, said hitch bar lockably positionable between a retracted position contained generally within said bow cavity and an extended position extended and cantilevered forwardly of said bow for releasable mounting of a distal end thereof to a tow bar.

9. The apparatus of claim 1 wherein said lower ends of said suspension struts are pivotally mounted to said elongate members at generally a mid-point along said elongate members.

10. The apparatus of claim 1 wherein said hull is stepped, forward of said aft wheel wells.

11. The apparatus of claim 1 wherein said aft wheel wells are pressurized.

12. The apparatus of claim 1 further comprising means for directing air curtains downwardly from said aft wheel wells.

13. The apparatus of claim 1 wherein said rear wheels when in said extended and locked position are located generally at a balance point of said hull, whereby trailering of said hull on roadways with said nose wheel retracted is facilitated.

* * * * *